US008931699B1

United States Patent
Wade et al.

(10) Patent No.: US 8,931,699 B1
(45) Date of Patent: Jan. 13, 2015

(54) BIDIRECTIONAL AUDIO COMMUNICATION IN READER DEVICES

(71) Applicant: Square, Inc., San Francisco, CA (US)

(72) Inventors: Jeremy Wade, San Francisco, CA (US); Thomas Templeton, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/231,598

(22) Filed: Mar. 31, 2014

Related U.S. Application Data

(60) Provisional application No. 61/914,731, filed on Dec. 11, 2013.

(51) Int. Cl.
 *G06K 7/00* (2006.01)
 *G06K 7/08* (2006.01)
 *G06K 7/01* (2006.01)

(52) U.S. Cl.
 CPC *G06K 7/089* (2013.01); *G06K 7/01* (2013.01); *G06K 7/082* (2013.01)
 USPC .......................... 235/449; 235/435; 235/439

(58) Field of Classification Search
 CPC ... G06K 7/087; G06Q 20/3223; H04B 5/0037
 USPC .......................... 235/449, 439, 435
 See application file for complete search history.

(56) References Cited

U.S. PATENT DOCUMENTS

| | | | |
|---|---|---|---|
| 3,854,036 A | 12/1974 | Gupta | |
| 4,254,441 A | 3/1981 | Fisher | |
| 4,788,420 A | 11/1988 | Chang et al. | |
| 5,173,597 A | 12/1992 | Anglin | |
| 5,589,855 A | 12/1996 | Blumstein et al. | |
| 5,679,943 A | 10/1997 | Schultz et al. | |
| 6,021,944 A | 2/2000 | Arakaki | |
| 6,032,859 A | 3/2000 | Hughes et al. | |
| 6,061,666 A | 5/2000 | Do et al. | |
| 6,234,389 B1 | 5/2001 | Valliani et al. | |
| 6,400,517 B1 | 6/2002 | Murao | |
| 6,476,743 B1 | 11/2002 | Brown et al. | |
| 7,309,012 B2 | 12/2007 | Von Mueller et al. | |
| 7,600,673 B2 | 10/2009 | Stoutenburg et al. | |
| 7,703,676 B2 | 4/2010 | Hart et al. | |
| 7,757,953 B2 | 7/2010 | Hart et al. | |

(Continued)

FOREIGN PATENT DOCUMENTS

WO 2010/111130 9/2010

*Primary Examiner* — Thien M Le
*Assistant Examiner* — Claude J Brown
(74) *Attorney, Agent, or Firm* — Novak Druce Connolly Bove + Quigg LLP

(57) ABSTRACT

Aspects of the subject disclosure provide a card reader for receiving payment card information at a mobile point-of-sale terminal. In some implementations, a reader of the subject technology can include a memory, a conditioning module and a 3.5 mm audio plug including an audio bus that is configured for insertion into a headphone port of a host device, such as a smart phone or tablet computer. Implementations of the subject technology also include a microprocessor configured to perform operations for receiving a training sequence for use in determining communication parameters associated with a mobile device, and in response to the training sequence, transmitting an acknowledgement signal to the mobile device, via the audio bus, to indicate that a communicative coupling with the mobile device has been successfully established.

20 Claims, 5 Drawing Sheets

(56) References Cited

U.S. PATENT DOCUMENTS

| Patent/Pub. No. | Date | Name | Class |
|---|---|---|---|
| 7,793,834 B2 | 9/2010 | Hachey et al. | |
| 7,810,729 B2 | 10/2010 | Morley, Jr. | |
| 8,011,587 B2 | 9/2011 | Johnson et al. | |
| 8,231,055 B2 | 7/2012 | Wen | |
| 8,297,507 B2 | 10/2012 | Kayani | |
| 8,336,771 B2 | 12/2012 | Tsai et al. | |
| 8,376,239 B1 | 2/2013 | Humphrey | |
| 8,500,010 B1 * | 8/2013 | Marcus et al. | 235/380 |
| 8,560,823 B1 | 10/2013 | Aytek et al. | |
| 8,571,989 B2 | 10/2013 | Dorsey et al. | |
| 8,573,487 B2 | 11/2013 | McKelvey | |
| 8,573,489 B2 | 11/2013 | Dorsey et al. | |
| 8,584,946 B2 | 11/2013 | Morley, Jr. | |
| 8,602,305 B2 | 12/2013 | Dorsey et al. | |
| 8,612,352 B2 | 12/2013 | Dorsey et al. | |
| 8,615,445 B2 | 12/2013 | Dorsey et al. | |
| 8,640,953 B2 | 2/2014 | Dorsey et al. | |
| 8,662,389 B2 | 3/2014 | Dorsey et al. | |
| 8,678,277 B2 | 3/2014 | Dorsey et al. | |
| 8,701,996 B2 | 4/2014 | Dorsey et al. | |
| 8,701,997 B2 | 4/2014 | Dorsey et al. | |
| 8,763,900 B2 | 7/2014 | Marcus et al. | |
| 8,794,517 B1 | 8/2014 | Templeton et al. | |
| 2002/0017568 A1 | 2/2002 | Grant et al. | |
| 2002/0165462 A1 | 11/2002 | Westbrook et al. | |
| 2003/0132300 A1 | 7/2003 | Dilday et al. | |
| 2004/0033726 A1 | 2/2004 | Kao | |
| 2004/0104268 A1 | 6/2004 | Bailey | |
| 2004/0128256 A1 | 7/2004 | Krouse et al. | |
| 2004/0151026 A1 | 8/2004 | Naso et al. | |
| 2005/0156037 A1 | 7/2005 | Wurzburg | |
| 2005/0156038 A1 | 7/2005 | Wurzburg | |
| 2005/0194452 A1 | 9/2005 | Nordentoft et al. | |
| 2005/0219728 A1 | 10/2005 | Durbin et al. | |
| 2005/0236480 A1 | 10/2005 | Vrotsos et al. | |
| 2005/0247787 A1 | 11/2005 | Von Mueller et al. | |
| 2006/0000917 A1 | 1/2006 | Kim et al. | |
| 2006/0049255 A1 | 3/2006 | Von Mueller et al. | |
| 2006/0152276 A1 * | 7/2006 | Barksdale | 329/315 |
| 2007/0063048 A1 | 3/2007 | Havens et al. | |
| 2008/0017712 A1 | 1/2008 | Hart et al. | |
| 2008/0040274 A1 | 2/2008 | Uzo | |
| 2010/0108762 A1 * | 5/2010 | Morley, Jr. | 235/449 |
| 2010/0243732 A1 | 9/2010 | Wallner | |
| 2010/0314446 A1 | 12/2010 | Morley, Jr. | |
| 2011/0053560 A1 | 3/2011 | Jain et al. | |
| 2011/0062235 A1 | 3/2011 | Morley, Jr. | |
| 2011/0084140 A1 | 4/2011 | Wen | |
| 2011/0161235 A1 | 6/2011 | Beenau et al. | |
| 2011/0174879 A1 | 7/2011 | Morley, Jr. | |
| 2011/0180601 A1 | 7/2011 | Morley, Jr. | |
| 2011/0202463 A1 | 8/2011 | Powell | |
| 2012/0011024 A1 | 1/2012 | Dorsey et al. | |
| 2012/0011071 A1 | 1/2012 | Pennock et al. | |
| 2012/0052910 A1 * | 3/2012 | Mu et al. | 455/558 |
| 2012/0095869 A1 | 4/2012 | McKelvey | |
| 2012/0097739 A1 | 4/2012 | Babu et al. | |
| 2012/0118956 A1 | 5/2012 | Lamba | |
| 2012/0118959 A1 | 5/2012 | Sather et al. | |
| 2012/0118960 A1 | 5/2012 | Sather et al. | |
| 2012/0126005 A1 | 5/2012 | Dorsey et al. | |
| 2012/0126006 A1 | 5/2012 | Dorsey et al. | |
| 2012/0126007 A1 | 5/2012 | Lamba | |
| 2012/0126010 A1 | 5/2012 | Babu et al. | |
| 2012/0126011 A1 | 5/2012 | Lamba et al. | |
| 2012/0126012 A1 | 5/2012 | Lamba et al. | |
| 2012/0126013 A1 | 5/2012 | Sather et al. | |
| 2012/0126014 A1 | 5/2012 | Sather et al. | |
| 2012/0130903 A1 | 5/2012 | Dorsey et al. | |
| 2012/0132712 A1 | 5/2012 | Babu et al. | |
| 2012/0138683 A1 | 6/2012 | Sather et al. | |
| 2012/0168505 A1 | 7/2012 | Sather et al. | |
| 2012/0234918 A1 * | 9/2012 | Lindsay | 235/449 |
| 2012/0259651 A1 | 10/2012 | Mallon et al. | |
| 2012/0270528 A1 | 10/2012 | Goodman | |
| 2013/0031003 A1 | 1/2013 | Dorsey et al. | |
| 2013/0031004 A1 | 1/2013 | Dorsey et al. | |
| 2013/0087614 A1 * | 4/2013 | Limtao et al. | 235/449 |
| 2013/0200147 A1 | 8/2013 | Dorsey et al. | |
| 2013/0200148 A1 | 8/2013 | Dorsey et al. | |
| 2013/0200149 A1 | 8/2013 | Dorsey et al. | |
| 2013/0200153 A1 | 8/2013 | Dorsey et al. | |
| 2013/0200154 A1 | 8/2013 | Dorsey et al. | |
| 2013/0204788 A1 | 8/2013 | Dorsey et al. | |
| 2013/0204791 A1 | 8/2013 | Dorsey et al. | |
| 2013/0204792 A1 | 8/2013 | Dorsey et al. | |
| 2013/0207481 A1 * | 8/2013 | Gobburu et al. | 307/104 |
| 2013/0254117 A1 | 9/2013 | von Mueller et al. | |
| 2013/0254118 A1 | 9/2013 | Dorsey et al. | |
| 2013/0320089 A1 | 12/2013 | Marcus et al. | |
| 2014/0001257 A1 | 1/2014 | Dorsey et al. | |
| 2014/0001263 A1 | 1/2014 | Babu et al. | |
| 2014/0017955 A1 | 1/2014 | Lo et al. | |
| 2014/0061301 A1 | 3/2014 | Cho et al. | |
| 2014/0076964 A1 | 3/2014 | Morley, Jr. | |
| 2014/0097242 A1 | 4/2014 | McKelvey | |
| 2014/0124576 A1 * | 5/2014 | Zhou et al. | 235/449 |
| 2014/0144983 A1 | 5/2014 | Dorsey et al. | |
| 2014/0203082 A1 | 7/2014 | Huh | |

\* cited by examiner

BIDIRECTIONAL AUDIO COMMUNICATION IN READER DEVICES

CROSS-REFERENCE TO RELATED APPLICATIONS

This application claims the benefit of U.S. Provisional Patent Application No. 61/914,731, entitled "BIDIRECTIONAL AUDIO COMMUNICATION IN READER DEVICES", filed on Dec. 11, 2013, and which is hereby expressly incorporated herein by reference in its entirety.

BACKGROUND

The ubiquity of headphone ports makes them an attractive option for use as communication channels for attachable hardware devices. For example, 3.5 mm audio ports are standard on many devices, and in particular mobile devices such as smart phones and tablet computers. Such ports can be used to provide communication between a host mobile device and a hardware attachment, such as an attachable card reader (e.g. "reader") for reading information from the magnetic stripe of a payment card.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
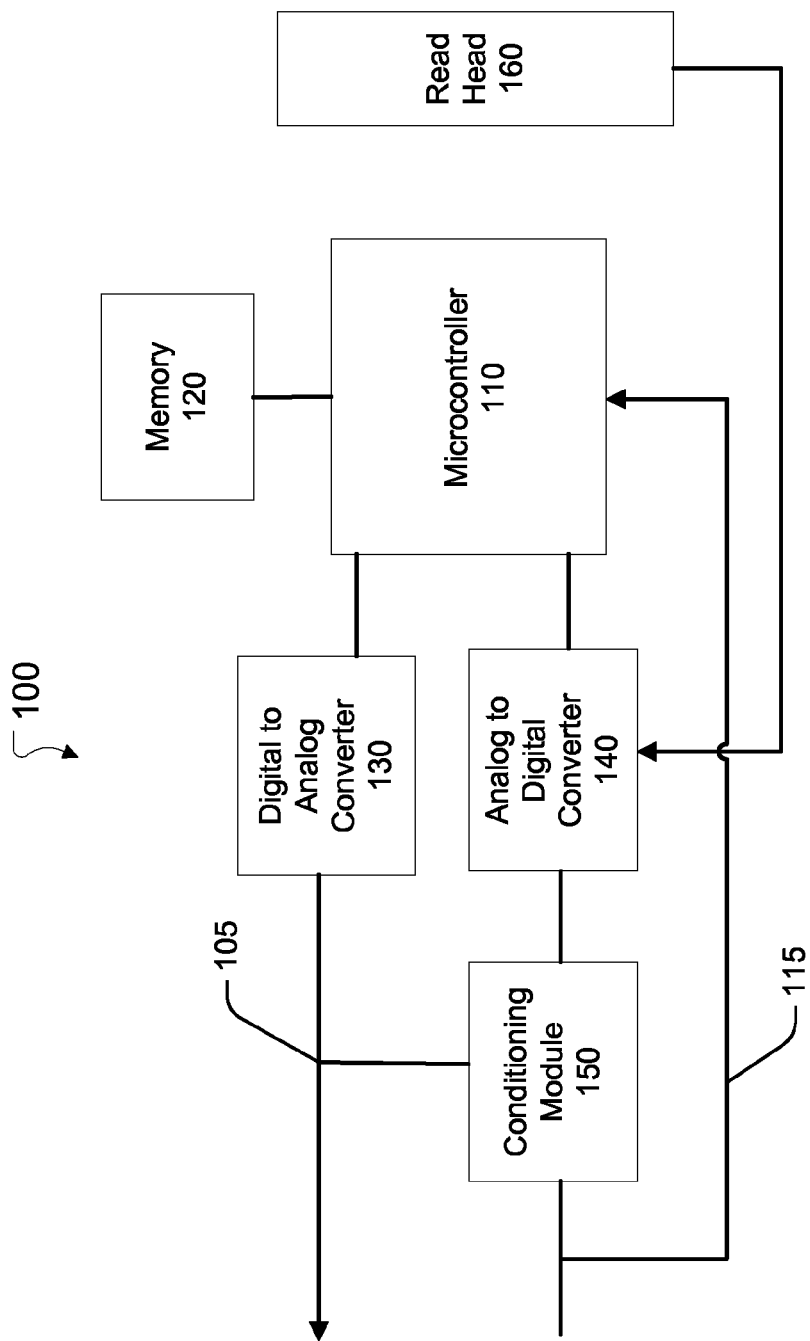
FIG. 1 illustrates a conceptual block diagram of hardware components used to facilitate bi-directional communication with a reader.

The detailed description set forth below is intended as a description of various configurations of the subject technology and is not intended to represent the only configurations in which the technology can be practiced. The appended drawings are incorporated herein and constitute a part of the detailed description, which includes specific details for the purpose of providing a more thorough understanding of the subject technology. However, it will be clear that the subject technology is not limited to the specific details set forth herein and may be practiced without these specific details. In some instances, structures and components are shown in block diagram form in order to avoid obscuring the concepts of the subject technology.

Due to limitations in transmitting data over audio ports, conventional readers are restricted to unidirectional communication and are only capable of sending signals to a host mobile device. Accordingly, when payment card information is read and transmitted by the reader, the reader has no way to acknowledge that the information has been properly received. In some conventional reader implementations, the reader can be configured to send multiple iterations of data to the host device (e.g., smart phone or tablet computer), in order to increase the likelihood that the data is received. However, it would be advantageous for the reader to receive signaling from the host device, for example, to provide acknowledgements of data receipt. Additionally, bi-directional communication over the audio port could provide several other advantages, including but not limited to, enabling the reader to configure reader-to-host communication, and for receiving reader firmware updates, etc.

Systems and methods in accordance with various aspects of the present disclosure overcome one or more of the above-referenced and other deficiencies in conventional reader-to-host communication. In particular, aspects of the subject technology provide solutions for enabling bi-directional communication over audio ports, such as standard 3.5 mm audio/headphone ports. As discussed in further detail below, bi-directional audio port communication can yield several advantages including, increased transmission bandwidth and session based management for reader communications.

For host-to-reader communication, audio signaling is transmitted by the host device, such as a mobile phone or tablet computer over an audio bus (such as the audio port or headphone jack). The audio signaling is then received by a reader on a left and/or right channel of the audio bus. Received signals are digitized e.g., using an analog-to-digital converter (ADC), before being provided to the microcontroller or processor of the reader.

Through the ability to receive audio signals, and thus, data, on one (or both) of the left/right audio channels, several host to reader communication features may be implemented. In some aspects, different kinds of data can be selected for transmission to the mobile host on separate audio channels. For instance, a timing or clock signal may be provided on one audio channel, such as the left channel, whereas data is provided on other channel (e.g., the right channel). As such, both channels may be utilized for the timing and transmission of data.

In another aspect, the receipt of signaling on multiple audio channels can be used to facilitate the encoding of information. By way of example, data may be encoded based on differences in signaling that is provided on left and right audio channels. As explained in further detail below a converter (e.g., including digital to analog converter and an analog to digital converter), may be used to facilitate the decoding of data based on signaling differences on the audio channel.

In yet another aspect, audio signaling received from a mobile host device may include data for use by the card reader. For example, a music signal may be modulated by the mobile host to include payload data for the card reader. By mixing payload data in an audio signal (e.g., a music signal), the card reader can receive payload data simultaneously with the broadcast of music over a headphone port of the mobile device.

For reader-to-host communication, digital information provided by the reader (e.g., a microcontroller of the reader) is converted into an analog signal, using a digital-to-analog converter (DAC), before transmission to a mobile device via an audio port. In certain aspects, Hi-Fi audio codecs can be used to represent digital information in an analog signal, or at what appears to be an analog (audio) signal to the signal processing of the host device or smart phone. Analog signaling transmitted by the reader is provided in the form of modulated current carried by a microphone bus e.g., of a standard 3.5 mm audio port. Once received, analog signaling is decoded and digitized using software and/or hardware of the host device.

In certain aspects, a conditioning module is used to offset received AC signaling in order to standardize signal properties (e.g., amplitude) and eliminate voltage components. Signal conditioning can also help to address variations caused by differences between different mobile devices, for example, due to differences in headphone volume settings etc. Conditioning ensures that voltage levels of the received signaling are adjusted to fall within a predetermined range before being provided to a microcontroller of the reader.

In certain aspects, connection of a reader to a host mobile device can trigger transmission of a predetermined training sequence from the mobile device to the reader. Through advanced knowledge of the training sequence, the reader can use the training sequence to assess a quality of the received signal. This assessment can be used to facilitate calibration of the reader e.g., by adjusting or tuning circuitry of the conditioning module. Once calibrated, the reader can be better configured to receive communication from the host mobile device.

FIG. 1 illustrates a conceptual block diagram of hardware components of a reader configured for bi-directional communication, according to some aspects of the subject technology. Reader 100 includes microcontroller 110, memory 120, digital-to-analog converter (DAC) 130, analog-to-digital converter (ADC) 140, conditioning module 150, and read head 160.

As illustrated, microcontroller 110 is coupled to memory 120, DAC 130 and ADC 140. Additionally, microcontroller 110 is coupled to conditioning module 150, via speaker channel 115, as well as read head 160, via ADC 140. In turn, ADC 130 is coupled to conditioning module 150, via microphone channel 105.

It is understood that reader 100 can be implemented using various other hardware components and/or configurations, and is not limited to the architecture depicted in FIG. 1. For example, microcontroller 110 can be implemented using a general-purpose processor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing.

Additionally, various types of memory can be utilized in place of, or in addition to, memory 120. Similarly, one or more sequences of instructions may be stored as firmware on a ROM within microcontroller 110. One or more sequences of instructions can also be software stored and read from another storage medium, such as the flash memory array, or received from a host device (e.g., a mobile device such as a smart phone or tablet computing device) via a host interface. ROM, storage mediums, and flash memory arrays represent examples of machine or computer readable media storing instructions/code executable by microcontroller 110. Machine or computer readable media may generally refer to any medium or media used to provide instructions to microcontroller 110, including both volatile media, such as dynamic memory used for storage media or for buffers within microcontroller 110, and non-volatile media, such as electronic media, optical media, and magnetic media.

Taken together, microphone channel 105 and speaker channel 115 can form a portion of an audio bus incorporating a standard 3.5 mm audio plug (not shown). In some implementations, speaker channel 115 can include multiple audio channels, such as a left-speaker channel and a right-speaker channel of a 3.5 mm headphone port.

As described in further detail below, audio signaling received on speaker channel 115 can be simultaneously provided to microcontroller 110 and conditioning module 150. Audio signaling received by the microcontroller can be used to provide voltage information to the conditioning module so that the conditioning module parameters can be tuned to provide proper voltage offsets for the received audio signals. In this way, the microcontroller can "listen" to the received audio signal while adjusting conditioning parameters in order to standardize the received signals before digital conversion and further processing are performed.

Conditioning module 150 can be configured to clamp incoming audio signals to eliminate negative voltage components. In certain aspects, an analog output of microcontroller 110 is provided to an ADC (e.g., ADC 130), and digital information about the received signal is output to conditioning module 150.

Figure 2:
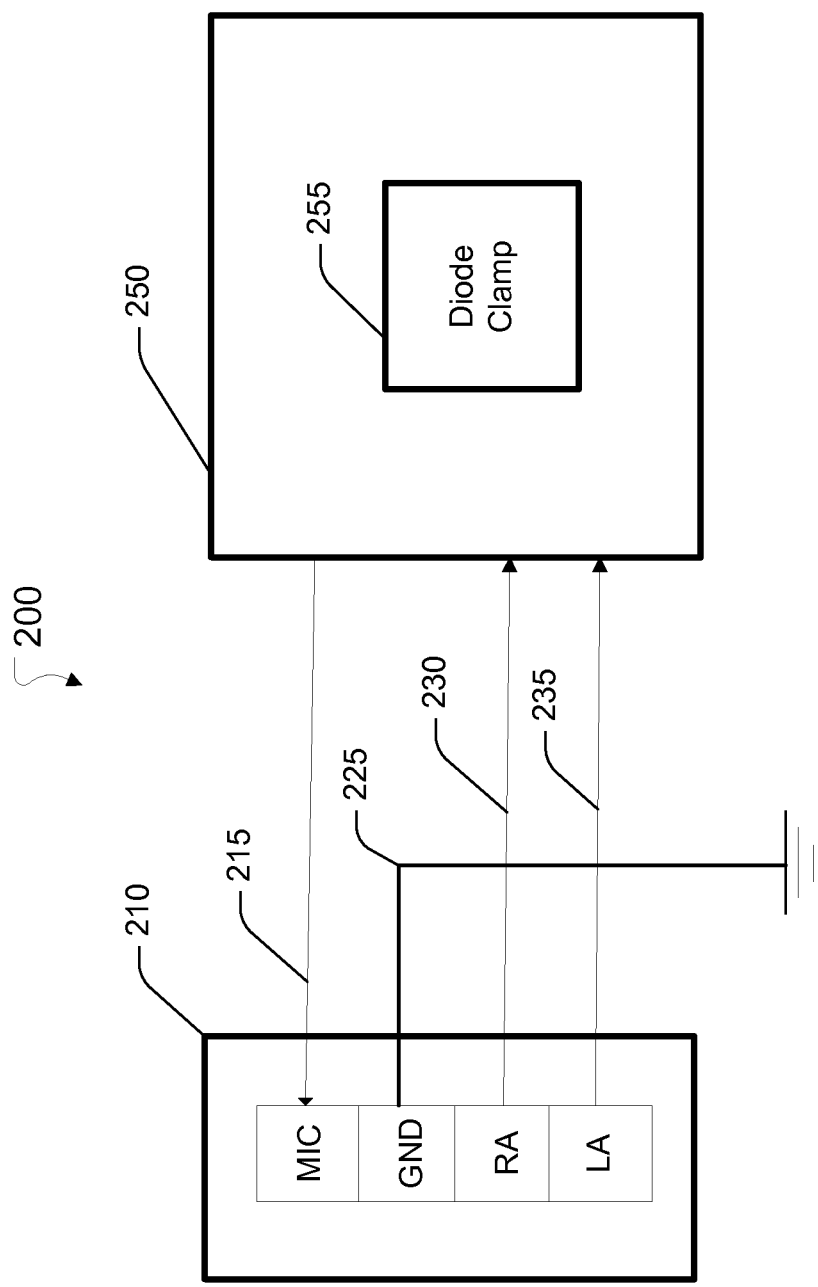
FIG. 2 illustrates a conceptual block diagram of the coupling between an audio bus and a conditioning module, according to certain aspects of the technology.

An example of a conceptual block diagram of the coupling between an audio bus and a conditioning module is illustrated in circuit 200 of FIG. 2. As illustrated, circuit 200 comprises an audio bus 210, that includes microphone channel 215, ground 225, right audio channel 230, and left audio channel 235. Schematic 200 further depicts a conditioning module 250, which includes a diode clamp 255. As discussed above, conditioning module 250 is coupled to, and configured to received audio signals from, audio bus 210. As discussed in further detail below, conditioning module 250 can also be configured to provide conditioned outputs to a microcontroller (not shown).

Although conditioning of an incoming audio signal can be performed using different circuit implementations than those illustrated in circuit 200, the illustrated implementation makes use of a diode clamp 255 for biasing received analog signals. As discussed above with respect to FIG. 1, biasing of the diode clamp can be based on inputs received from the microcontroller and provided to conditioning module 250 via a DAC, such as DAC 130.

Inputs received by conditioning module 250 from the microcontroller can help conditioning module 250 listen the incoming audio signal and adjust the signal accordingly, e.g., by biasing or thresholding the signal before it is provided to the microcontroller. An example process for conditioning incoming audio signals, and for facilitating bi-directional communication of a reader, is discussed in further detail with respect to FIG. 3.

Figure 3:
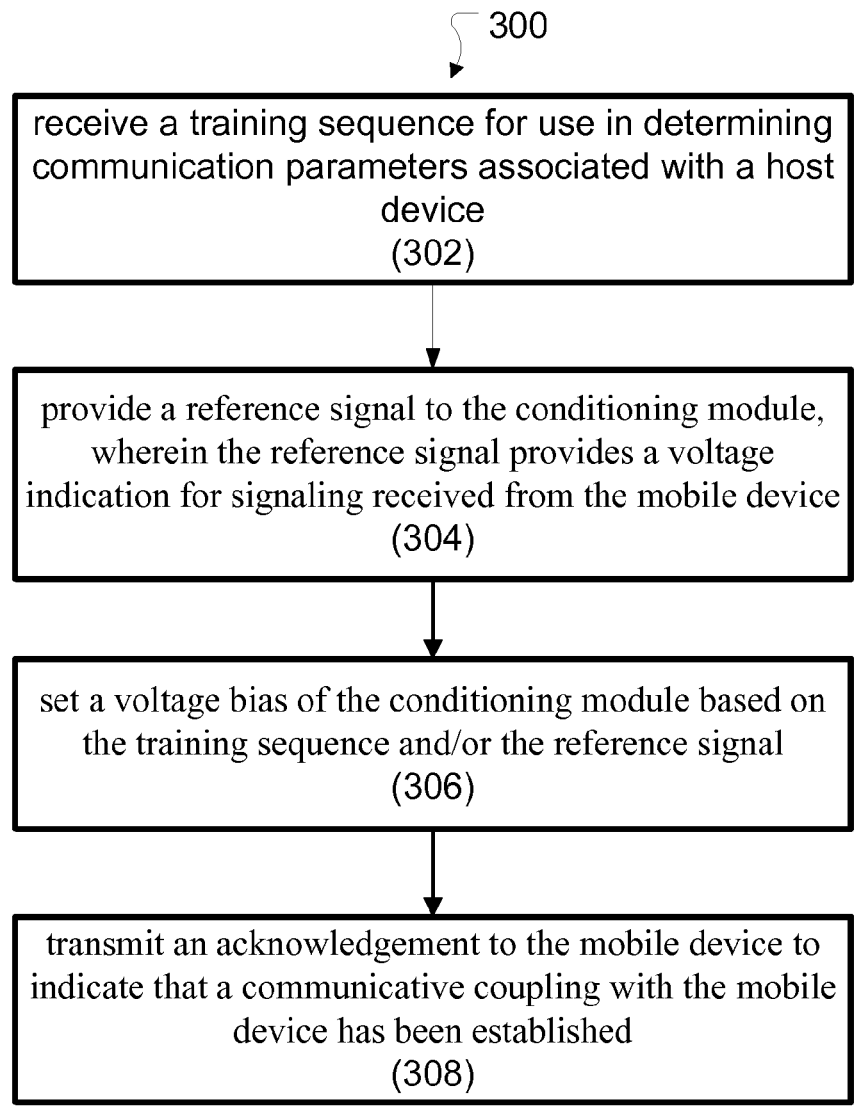
FIG. 3 illustrates an example process with which bi-directional reader communication can be implemented.

Specifically, FIG. 3 illustrates an example process 300 for implementing bi-directional reader communication, beginning with step 302 in which a training sequence is received at a reader via an audio bus. In certain aspects, the training sequence is used by the reader to verify a connection with a host device (e.g., mobile device) and to determine communication parameters associated with the mobile device.

Although the audio bus can include various types of busses and/or audio channels, in certain implementations the audio bus is a standard audio bus, including a 3.5 mm audio plug, including left and right speaker channels, as described above with respect to speaker channel 115 of FIG. 1. The training sequence can be received on the left and/or right speaker channel, and can be used by the reader to determine if signaling from a host mobile device is being properly received.

By way of example, a training sequence received by the reader (e.g., microcontroller 110) from a smart phone, can be used to indicate a successful connection to the reader. Because the reader can be configured to know what the training sequence should look like, a comparison of the received training sequence with a training sequence profile can indicate to the reader whether adjustments can be made to the smart phone to improve signal quality. Although an analysis of the training sequence can indicate various parameters that require tuning, in some implementations, amplitude of the training sequence is used to determine whether volume settings of the smart phone need to be adjusted.

In step 304, a reference signal is provided to the conditioning module. Although the reference signal can be used to tune different parameters of the conditioning module depending on implementation, in some aspects the reference signal is used to convey an instantaneous (or near instantaneous) voltage level of a currently received audio signal to the conditioning module.

The reference signal can be derived and/or based on any AC signaling received by the reader, including the training sequence. Using the reference signal, the conditioning module can adjust a voltage bias that is applied to the received audio signaling, as indicated by step 306. For example, the reference signal can indicate when the voltage of a received audio signal is negative so that the conditioning module can bias the received signal (e.g., to a positive voltage value), before it is digitized and passed to the microcontroller. By actively "listening" to the received AC signaling, and providing feedback to the conditioning module, the reader can tune biasing and thresholding parameters, and thus can actively adapt to variations in received signaling. One advantage of the ability to engage in real-time tuning of the reader circuitry is the ability to adapt to variations in signals received across different host devices, or by similar devices with different signal properties, such as volume settings.

Although tuning of the reader (e.g., using the conditioning module) can be performed throughout a communication session with a host device, in certain implementations, tuning is only performed upon an initial connection with a host. That is, the conditioning module adjusts its biasing and thresholding based on the reference signal derived from the training sequence, and then no additional adjustments are made for the remainder of the communication session. In certain aspects, tuning performed by the conditioning module is performed on a session-by-session basis, where circuit characteristics are not tuned or updated until the beginning of a new session (e.g., initial connection to a host) is detected. Thus after initial tuning has been performed, the reader is configured to receive signaling from the mobile device for the remainder of the communication session, i.e., until the reader is removed from the headphone port of the mobile device.

In step 308, an acknowledgement is sent to the host (e.g., mobile device) to indicate that a communicative coupling with the mobile device has been successfully established. Reader-to-host communications can be provided on a microphone channel of a standard 3.5 mm audio port, such as microphone channel 105 discussed above in reference to FIG. 1. However, before transmission across the audio bus, reader-to-host communications must first be converted to an analog waveform, for example, using DAC 130.

The ability to provide signaling to the host via the microphone channel provides significant advantages over conventional unidirectional reader communication implementations. For example, information provided to the host can provide data necessary to manage communication with the reader in discreet sessions. As discussed, above session based communication can be used to determine when turning of the reader should be performed. Additionally, communications provided to the host can be used to provide indications of host parameters that can be adjusted, for example, to reduce a bit error rate (BER) for signaling received by the reader.

One potential difficulty in transmitting digital information between the reader and the host, is that low frequency audio signals may be easily passed over the AC coupling in the communication path. To address this issue, digital information can be pre-processed so that the digital data is "whitened," resulting in an audio signal that meets a minimal frequency threshold. By ensuring a minimum frequency of the resultant audio signal, the process can help to avoid the loss of digital data passed over the AC coupling. Although whitening for the digital signal, either on the reader or host side, can be performed in various manners, in certain aspects the digital signal can be encrypted to ensure a sufficient Gaussian information distribution necessary to meet the minimum frequency requirements of the AC coupling.

Figure 4:
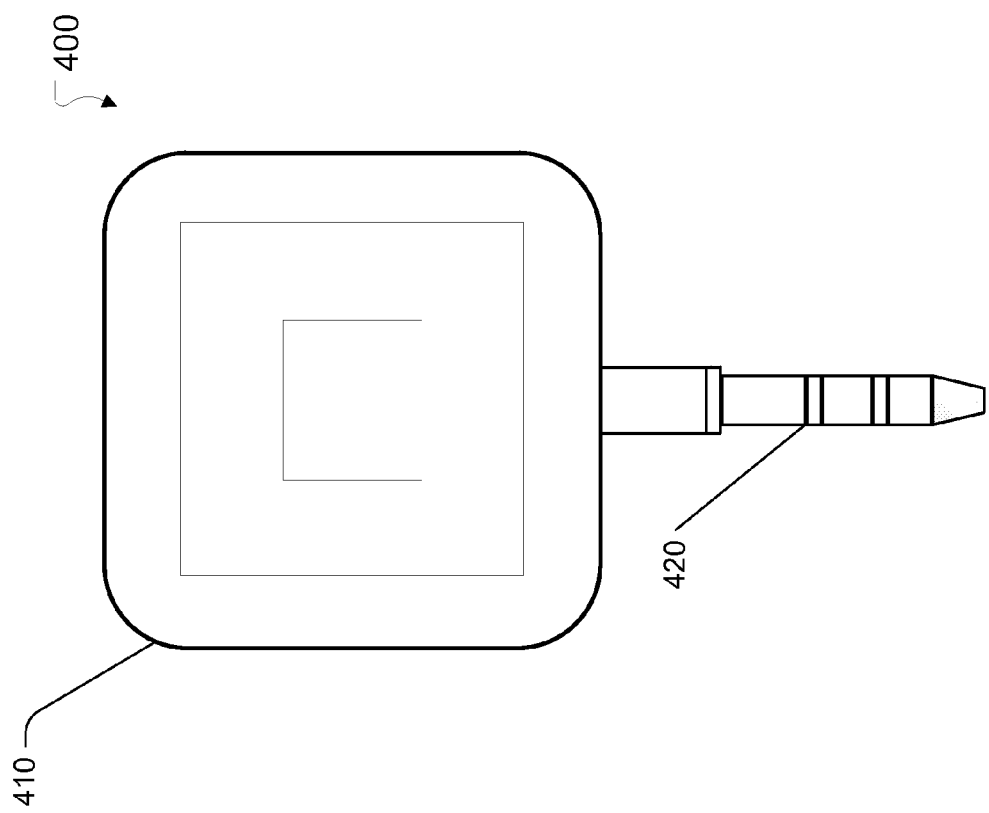
FIG. 4 illustrates an example reader, including a 3.5 mm audio plug, according to some embodiments.

FIG. 4 illustrates an example reader 400 according to some embodiments of the subject technology. As illustrated, reader 400 includes a housing 410 that is coupled to an audio plug 420 (e.g., a 3.5 mm audio plug).

Housing 410 contains the hardware components and circuitry of reader 400, as illustrated with respect to the example of FIG. 1. Additionally, body portion 410 includes a slot (not shown) through which a payment card, such as a credit or debit card, may be swiped. Passage of a magnetic stripe of the payment card past a read head (e.g., read head 160 contained in housing 410) can enable payment information to be received via the read head. The resulting signal provided by the read head is typically an analog signal that must be digitized e.g., using ADC 140, before the resulting digital information is provided to microcontroller 110.

Different types of information can be read from a magnetic stripe, depending on implementation. For example, user and payment card account information can be read from track 1 and track 2 of the magnetic stripe, respectively. However, in other implementations, any track (or combination of tracks) may be read from the magnetic stripe, including any combination, or all of tracks 1, 2 and 3.

As illustrated, body portion 410 is physically and communicatively coupled to audio plug 420, which can be removably inserted into a headphone port of a host device, such as a smart phone, personal computer, tablet device, or the like. As discussed above with respect to FIGS. 1 and 2, audio plug 420 forms part of an audio bus that includes left and right speaker channels, a microphone channel and a ground connection. Once audio plug 420 is inserted into the headphone port of a host device, such as a smart phone, bi-directional communication between reader 400 and the host is enabled e.g., via the left/right speaker channels and microphone channel, using the methods and systems discussed above.

Although the reader illustrated in FIG. 4 can accept payment cards containing a magnetic stripe (e.g., using a read head), it is understood that the reader can be configured to receive other types of payment cards, and accordingly can contain additional or different hardware and/or software modules than those described above with respect to FIG. 1. For example, housing 410 can include a dip slot for accepting integrated circuit cards ("IC cards"), such as those conforming to the Europay, Mastercard, and Visa (EMV) standard.

Figure 5:
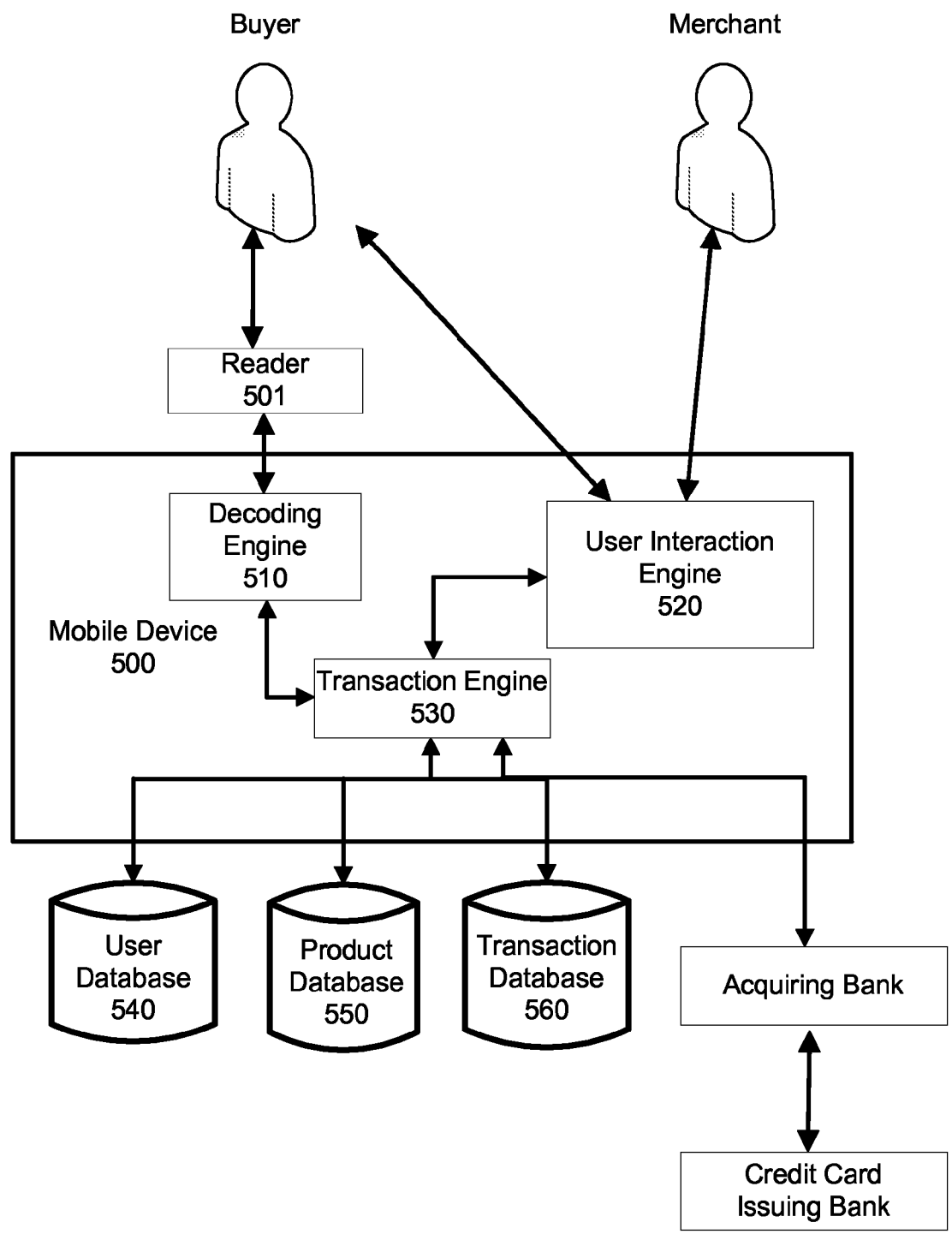
FIG. 5 depicts a conceptual environment in which a reader of the subject technology can be used to facilitate a financial transaction between a buyer and a merchant.

Once successful bidirectional communication has been established between the reader and its host, the reader can be used to facilitate a payment transaction, for example between a merchant and a buyer using a magnetic payment card. FIG. 5 depicts a conceptual environment in which a reader of the subject technology can be used to facilitate a financial transaction between a buyer and a merchant. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein multiple hosts can be connected by one or more networks.

In the example of FIG. 5, the system includes a mobile device 500, a reader 501 connected to mobile device 500, a decoding engine 510, a user interaction engine 520, and a transaction engine 530, all running on mobile device 500. Additionally, the system may also include one or more of a user database 540, a product or service database 550, and a transaction database 560, all coupled to the transaction engine 530.

As used herein, the term engine refers to software, firmware, hardware, and/or other components used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

As used herein, the term database is used broadly to include any known or convenient means for storing data, whether centralized or distributed, relational or otherwise.

In the example of FIG. 5, mobile device 500 to which reader 501 is connected can be, but is not limited to, a cell phone, such as Apple's iPhone, other portable electronic devices, such as Apple's iPod Touches, Apple's iPads, and mobile devices based on Google's Android operating system and any other portable electronic device that includes software, firmware, hardware, or any combination capable of at least receiving the signal, decoding if needed, exchanging information with a transaction server to verify the buyer and/or seller's account information, conducting the transaction, and generating a receipt. Typical components of mobile device 500 can include but are not limited to persistent memories like flash ROM, random access memory like SRAM, a camera, a battery, LCD driver, a display, a cellular antenna, a speaker, a Bluetooth circuit, and WiFi circuitry, where the persistent memory may contain programs, applications, and/or an operating system for the mobile device.

In some implementations, a system is provided with transaction engine 530 running on mobile device 500. In response to a financial transaction between a buyer and a seller, mobile device 500 accepts information selected including but not limited to information from financial transaction or information pertaining to financial transaction card used by the buyer in the transaction. Additionally, a financial transaction device can be utilized, Non-limiting examples of financial transaction devices include but are not limited to a, wristband, RFID chip, cell phone, biometric marker and the like. At least a portion of this information is communicated with a third party financial institution or payment network to authorize the transaction.

Payment confirmation can be made with a communication channel of the buyer's choice. As non-limiting examples, confirmation of payment can be an electronic notification in the form selected from at least one of, email, SMS message, tweet (message delivered via Twitter), instant message, communication within a social network and the like. In response to the transaction, a confirmation is made that the buyer is authorized to use the financial transaction card. In certain implementations, a confirmation can be provided that indicates a sufficiency of funds available to the buyer.

In the example of FIG. 5, reader 501 is configured to read data encoded in a magnetic strip of a card being swiped by a buyer and send a signal that corresponds to the data read to mobile device 500. However, as discussed above, reader 501 may be configured to received various payment card types, including but not limited to IC cards that can be provided to reader 501 using a dip slot.

The size of reader 501 can be miniaturized to be portable for connection with mobile device 500. For example, the size of card reader 501 can be miniaturized to an overall length of less than 1.5". In addition, the miniaturized card reader 501 is also designed to reliably read the card with minimum error via a single swipe by counteracting vendor specific filtering done by mobile device 501. Note that this broad overview is meant to be non-limiting as components to this process are represented in different embodiments.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only and recordable Blu-Ray® discs, ultra density optical discs, any other optical or magnetic media. The computer-readable media can store a computer program that is executable by at least one processing unit, such as a microcontroller, and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. A card reader comprising:
    a memory;
    a read module configured to read payment information from a financial payment card;
    an audio plug comprising a right audio channel, a left audio channel, and a microphone channel, the audio plug configured to communicatively and mechanically couple the card reader to a mobile device;

a processor coupled to the read module and the memory, wherein the processor is configured to send information to, and receive information from, the mobile device;

a conditioning module coupled to the right audio channel and the left audio channel, the conditioning module configured for standardizing voltage levels of incoming analog signals received at the conditioning module from the mobile device based on a training sequence received from the mobile device, wherein the training sequence comprises a predetermined AC waveform; and an analog to digital converter (ADC) coupled to the processor wherein the ADC is configured for receiving audio signals from the mobile device and converting the audio signals into digital signals for transmission to the processor, and a digital to analog converter (DAC), wherein the DAC is configured for receiving digital signals from the processor and converting the digital signals into audio signals for transmission to the mobile device.

2. The card reader of claim 1, wherein the ADC is further configured to receive a clock signal on at least one of the right audio channel and the left audio channel.

3. The card reader of claim 1, further comprising a converter coupled to the audio plug, wherein the converter comprises the ADC and the DAC and wherein the converter is configured to demodulate the audio signals received from the mobile device based on differences in signaling between the right audio channel and the left audio channel.

4. The card reader of claim 1, wherein the audio signals received from the mobile device comprise data modulated with music.

5. A reader for receiving payment card information at a mobile point-of-sale terminal, the reader comprising:
a memory;
a conditioning module configured for standardizing voltage levels of incoming analog signals received at the conditioning module from a mobile device for use in receiving communications from the mobile device;
an audio plug comprising an audio bus, wherein the audio plug is configured for insertion into a headphone port of the mobile device to provide communicative coupling between the reader and the mobile device; and
a microprocessor coupled to the memory, the conditioning module and the audio bus, wherein the microprocessor is configured to perform operations comprising:
receiving, from the mobile device via the audio bus, a training sequence for use in determining communication parameters associated with the mobile device, the training sequence comprising a predetermined AC waveform;
setting a voltage bias of the conditioning module based on the training sequence, wherein the voltage bias is to be used to standardize voltage levels for analog signaling received at the conditioning module from the mobile device; and
in response to the training sequence, transmitting an acknowledgement signal to the mobile device, via the audio bus, to indicate that a communicative coupling with the mobile device has been successfully established.

6. The reader of claim 5, wherein the audio bus comprises:
a left audio channel and a right audio channel, and
wherein the training sequence is received via one or more of the left audio channel and the right audio channel.

7. The reader of claim 5, wherein the audio bus comprises a microphone channel, and wherein the acknowledgement signal is transmitted to the mobile device via the microphone channel.

8. The reader of claim 5, wherein the microprocessor is further configured to perform operations comprising:
providing a reference signal to the conditioning module via a digital to analog converter, wherein the reference signal provides a voltage indication for signaling received from the mobile device.

9. The reader of claim 8, wherein the conditioning module is configured to clamp the signaling received from the mobile device to a predetermined voltage level.

10. The reader of claim 5, wherein the acknowledgement signal comprises whitened data for transmission over an AC coupling.

11. The reader of claim 5, wherein the microprocessor is coupled to the conditioning module via an analog to digital converter.

12. The reader of claim 5, further comprising:
a read head coupled to the microprocessor and configured to decode data on a magnetic stripe, and wherein the microprocessor is further configured to perform operations comprising:
receiving payment information from the read head;
transmitting the payment information to the mobile device, via the audio bus; and
receiving a transmission confirmation from the mobile device indicating that the payment information was successfully received.

13. A method for facilitating a financial transaction using a reader, the method comprising:
receiving a training sequence from a mobile device via an audio bus, wherein the training sequence comprises a predetermined AC waveform;
selecting a voltage bias of a conditioning module of the reader based on the training sequence, wherein the voltage bias is used to standardize analog signaling received from the mobile device; and
in response to the training sequence, transmitting an acknowledgement signal to the mobile device via the audio bus, the acknowledgement signal indicating that a communicative coupling between the reader and the mobile device is established.

14. The method of claim 13, wherein the audio bus is a 3.5 mm audio bus and comprises:
a left audio channel and a right audio channel, and
wherein the training sequence is received via one or more of the left audio channel and the right audio channel.

15. The method of claim 13, wherein the audio bus comprises a microphone channel, and wherein the acknowledgement signal is transmitted to the mobile device via the microphone channel.

16. The method of claim 13, further comprising:
providing a reference signal to the conditioning module via a digital to analog converter, wherein the reference signal provides a voltage indication for the analog signaling received from the mobile device.

17. The method of claim 13, wherein the acknowledgement signal comprises whitened data.

18. The method of claim 13, further comprising:
receiving payment information from a read head configured to decode data on a magnetic stripe;
transmitting the payment information to the mobile device, via the audio bus; and receiving a transmission confirmation from the mobile device indicating that the payment information was successfully received.

19. A non-transitory computer-readable storage medium comprising instructions stored therein, which when executed by one or more processors, cause the one or more processors to perform operations comprising:
  receiving a training sequence from a mobile device via an audio bus, wherein the training sequence is an analog signal comprising a predetermined waveform, and wherein the training sequence is used for configuring communication parameters of a mobile card reader to facilitate receipt of analog signaling from the mobile device;
  selecting a voltage bias of a conditioning module of the mobile card reader based on the training sequence, wherein the voltage bias is used to standardize analog signaling received from the mobile device; and
  in response to the training sequence, transmitting an acknowledgement signal to the mobile device via the audio bus, the acknowledgement signal indicating that a coupling between the reader and the mobile device is established.

20. The non-transitory computer-readable storage medium of claim 19, wherein the audio bus comprises a 3.5 mm audio jack.

* * * * *